Feb. 8, 1938. G. J. McQUEEN 2,107,384
TRUCK
Filed March 31, 1936
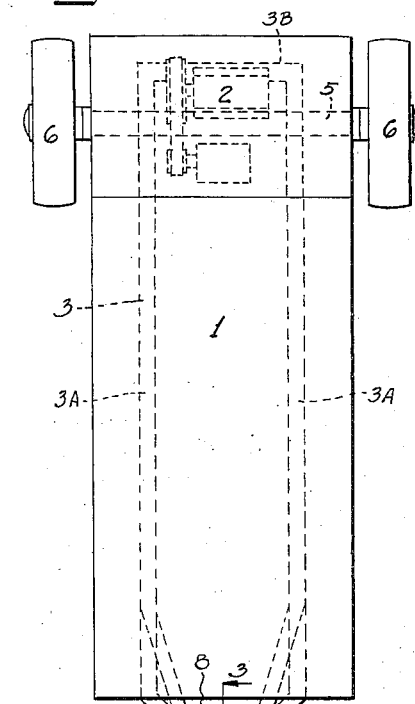
FIG. 1.
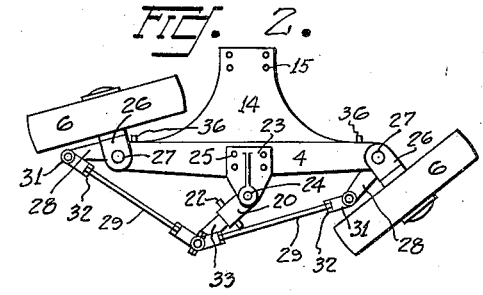
FIG. 2.
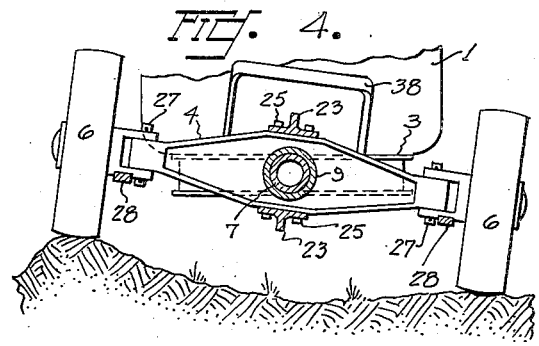
FIG. 4.
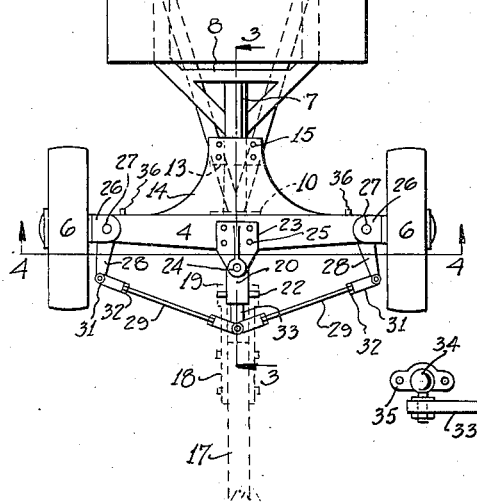
FIG. 3.
FIG. 5.
FIG. 6.
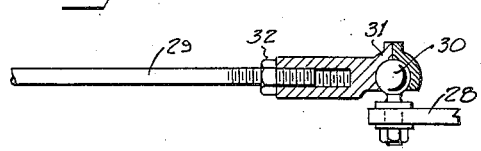
INVENTOR
GLENN J. McQUEEN
BY Harold L. Cook
ATTORNEY Patented Feb. 8, 1938

2,107,384

UNITED STATES PATENT OFFICE 2,107,384

TRUCK

Glenn J. McQueen, Portland, Oreg., assignor to The Hardie Manufacturing Company, Hudson, Mich., a corporation of Michigan Application March 31, 1936, Serial No. 71,909

5 Claims. (Cl. 280—111)

This invention relates to portable power sprayers, and has particular reference to trucks for such sprayers.

Portable sprayers are utilized chiefly for spraying orchards, vineyards and the like, and are usually employed during seasons when the ground is wet and soft and, consequently, very uneven. The equipment comprises a spray pump and power unit, and a spray tank, together with the necessary spray lines and connections. This equipment is mounted upon four-wheel trucks, which may be equipped with either a wagon pole or a tractor hitch, as desired. Heretofore such sprayers have been mounted on trucks having a wheel base of from 60 to 80 inches, to enable the vehicle to be turned in the smallest possible space in order to negotiate lanes between trees and vines. The short wheel base necessitated mounting the load over the axles, with the greater portion of the weight over one axle, and with the front wheels designed to cut under the frame in turning. Since it has been deemed impractical to mount a large capacity spray tank on a truck designed to be turned on so short a wheel base, the capacity of the tanks in such sprayers has been limited to between 200 and 400 gallons, to enable the sprayer to be safely turned in the shortest possible radius. Tanks of such limited capacity have been necessitated also by the difficulties encountered in maneuvering a sprayer having the load suspended directly over the axles under conditions which prevail in most orchards.

The subject matter of the present invention pertains to trucks embodying certain modifications and improvements in construction, and which are designed to carry sprayers equipped with large pumping units and large capacity tanks with ease and safety. A truck embodying the present invention will carry a load of 600 gallons of spray material into an orchard or vineyard, the truck being easily maneuvered over rough ground, and being turnable in a radius of approximately the length of the wheel base without danger of tipping over. The invention makes possible the use of a longer wheel base, thus lending stability to the load, and makes it possible to suspend the load, i. e., the spray tank, between the axles. Additional features of the improved construction include the reduced over-all height and the low center of gravity; greater stability for the load; greater strength and ruggedness in bearing construction; increased efficiency in operation; and reduced draft, short turning and ease of handling in rough ground.

It is a primary object of the invention to provide a truck for sprayers and the like which is capable of being turned in the shortest possible turning radius, and which is easily and safely maneuverable over rough or wet ground.

A further object of the invention is to provide a truck upon which large pumping units and large capacity tanks may be mounted, which will permit the load to be suspended between the front and rear axles, and which may be turned in a radius of approximately the length of the wheel base.

With these and other objects in mind, the invention resides in the novel construction and combination of parts hereinafter described, illustrated in the accompanying drawing and set forth in the appended claims; it being understood that various changes in form, proportion, size and details of construction within the scope of the claims may be resorted to without departing from the spirit or sacrificing any of the advantages of the invention.

In the drawing:

Figure 1 is a plan view of a portable sprayer embodying the principles of the present invention, the front wheels being illustrated in straight ahead position.

Figure 2 is a fragmentary plan view of the front axle construction illustrating the positions of the respective parts while negotiating a right hand turn.

Figure 3 is a sectional elevation taken on the line 3—3 of Figure 1.

Figure 4 is a front elevation, partly in section, taken on the line 4—4 of Figure 1.

Figure 5 is a sectional elevation of the auxiliary axle bearing taken along the line 5—5 of Figure 3.

Figure 6 is a sectional elevation of a portion of one of the steering rods.

Preliminary to a more detailed description of the illustrated embodiment of the invention, it may be stated in brief that it comprises a tank 1 for spray solutions and the like, and a combined pump and power unit 2, which are mounted upon a truck comprising a frame 3, a front axle 4, a rear axle 5, and the usual complement of wheels 6.

The frame 3 includes a pair of longitudinally extending beams 3a and a cross bar 3b extending between the beams 3a at the rear end thereof and terminally welded thereto. The longitudinal beams 3a converge at their forward ends and are terminally welded to a cylindrical frame extension 7. The frame extension 7 is disposed longitudinally of the frame intermediate the forward ends of the beams 3a and abuts against a cross bar 8 interconnecting the longitudinal beams 3a intermediate their ends, preferably near the forward end thereof. The frame extension 7 projects forwardly of the beams 3a and engages a bearing housing 9 centrally disposed in the front axle 4 in such manner that the axle 4 is pivotally mounted upon the frame extension 7. An annular stop 10 is welded to the frame extension 7 so as to engage the rear face of the bearing housing 9, and a collar 11 is affixed to the forward end of the frame extension 7, as by means of a pin 12, so as to engage the front face of the bearing housing 9. These elements cooperate to prevent displacement of the axle 4 with respect to the frame, and act to take the forward pull or backward thrust of the body of the sprayer.

It will be noted that the front axle 4 and the rear axle 5 are maintained in parallel planes. The front axle 4 is restrained against movement in any but a vertical plane by means of the bearing housing 9 and an auxiliary bearing 13, each of which engage the frame extension 7, and which are maintained rigidly in spaced relation by means of a gusset plate 14. The gusset plate 14 is welded to the front axle 4, and is secured to the bearing 13 by means of bolts 15. For convenience in assembling the apparatus, the bearing 13 is a split bearing, its respective halves being maintained in proper alignment by means of the bolts 15 which secure the gusset plate thereto, and by means of bolts 16, as best seen in Figure 5. In the preferred embodiment of the invention the bearing 13 is disposed intermediate the forward ends of the beams 3a and the front axle 4, the function of the aligned bearings 9 and 13 and gusset plate 14 being to provide longitudinal bracing for the axle 4, and to provide a rugged pivotal mounting to permit movement of the axle in a vertical plane. Figure 4 illustrates the manner in which either front wheel of the truck may ride over elevations or depressions in rough ground without tilting the body of the sprayer laterally, the front axle 4 being capable of rocking in a transverse vertical plane at any angle of turning movement while adapting itself to the contour of the ground over which the sprayer is passing.

The draft mechanism comprises a hitch or tongue 17 having straps 18 bolted thereto which extend from the end thereof to form a clevis 19 designed to pivotally engage a draft clevis 20. Aligned recesses in the straps 18 cooperate with a recess 21 in the draft clevis 20 to receive a draft pin 22. The draft clevis 20 is hingedly secured to brackets 23 by means of a hinge pin 24, the brackets 23 being secured to the front axle 4 by means of cap screws 25. By means of the draft pin 22 the tongue 17 is mounted to swing in a vertical plane, and by means of the hinge pin 24 the draft mechanism is permitted to swing either to the right or left in a horizontal plane.

The front wheels 6 are mounted on stub axles 26—26 which are pivoted to the axle 4 by means of vertical pins 27—27. A forwardly projecting steering arm 28 is formed integral with each stub axle 26, and is adapted to be engaged by a steering rod 29. It will be noted that the steering arms 28—28 diverge somewhat, the divergence from a line at right angles to the axle being approximately 17°. As best seen in Figure 6, the forward end of each steering arm 28 is equipped with a ball 30 which is engaged by a socket 31 adjustably affixed to the end of each steering rod 29 as by a lock nut 32. The steering rods 29—29 are pivotally connected to an extension 33 of the draft clevis 20 by means of a ball 34 affixed to said extension 33 and socket 35 which forms the abutting ends of the steering rods 29—29.

By means of the construction just described the front wheels are steered by the tongue 17 and properly angled when the sprayer is turned so as to "point" or roll in the direction of travel of the apparatus. When the sprayer is drawn straight ahead the front wheels and tongue 17 are held in parallel relation by means of the steering arms 28—28 and steering rods 29—29. When, however, the sprayer is turned about, the wheels are moved to positions tangential to the pivot axis of the inner rear wheel, about which the sprayer pivots when being turned around. Thus, the wheels turn in true circles and do not slice or dig in the soft earth, but are respectively pointed in the direction of movement so that the only movement imparted to the wheel is its forward roll. Figure 2 illustrates the positions of the wheels when the sprayer is turned to the right. It will be noted that the wheels are non-parallel, the steering arm 28 which controls the right hand front wheel being swung through a greater arc than the steering arm controlling the left front wheel. This action is, of course, reversed when the sprayer is turned to the left. Stops 36 are affixed to the rear face of the axle 4 to limit the angle to which the stub axles may be moved by the steering arms 28.

From the foregoing description of the construction and arrangement of parts it will be seen that a truck has been devised which is admirably suitable for mounting a portable power sprayer, the greater part of the load, i. e., the spray tank, being suspended between the front and rear axles. The frame extension 7 forms a bearing for the front axle of relatively large diameter, the bearing surface being augmented by the bearing 13 held in longitudinally spaced relation from the front axle by means of the gusset plate 14. This construction provides a pivotal mounting for the axle which is of great strength and ruggedness, and which will not bind or pinch during turning movements over rough ground. The construction permits the use of a wheel base approximately three feet longer than is customary in this type of apparatus, whereby the load may be suspended between the axles to facilitate operating the apparatus in mud or over rough ground. The long wheel base lends stability to the load, and operators are enabled to handle loads of spray material far in excess of that which can be handled with safety on trucks heretofore in use. On the other hand, the turning radius has not been increased, the improved construction enabling the apparatus to be handled with even greater ease and safety under similar conditions. As a matter of convenience, a seat 37 is affixed to the forward end of the tank 1, and a foot rest 38 is provided for the occupant thereof.

Having now described my invention and in what manner the same may be used, what I claim as new and desire to protect by Letters Patent is:

1. In a vehicle, a frame including a pair of longitudinal beams, said beams converging at their forward ends, a frame extension disposed in the horizontal plane of said longitudinal beams and projecting forwardly of said beam ends, an axle pivotally mounting said frame extension, and means to brace said axle against horizontal movement with respect to said frame, said means rotatably mounting said frame.

2. In a vehicle, a frame, a trunnion member disposed in the horizontal plane of said frame and projecting forwardly therefrom, an axle pivotally mounting said trunnion member, and a brace to hold said axle against transverse horizontal movement relative to said frame, said brace rotatably mounting said frame for oscillation with said axle.

3. In a vehicle, a frame, a trunnion member disposed in the horizontal plane of said frame and projecting forwardly therefrom, an axle pivotally mounting said trunnion member, a bearing rotatably mounting said trunnion member intermediate the axle and said frame, and a plate interconnecting said axle and said bearing to brace said axle against horizontal movement relative to said frame.

4. In a vehicle, a frame including a pair of longitudinally extending side members, a cylindrical member disposed in the horizontal plane of the frame intermediate the side members, the side members converging at their forward ends to secure said cylindrical member, the cylindrical member projecting forwardly of said side members to constitute a trunnion, an axle pivotally mounting said trunnion, a bearing mounted upon said cylindrical member intermediate said frame and said axle, and a gusset plate rigidly connecting said axle and said bearing to brace said axle against horizontal movement relative to said frame.

5. In combination, a vehicle frame including a centrally disposed trunnion member projecting forwardly therefrom, an axle pivotally mounting said trunnion member, a bearing rotatably mounting said trunnion member intermediate said axle and said frame, the axle and said bearing being rigidly connected to brace the axle against transverse horizontal movement, dirigible wheels supporting said axle, said wheels being mounted to turn about vertical pivots at opposite ends of said axle, draft means for propelling the vehicle, and means for pivotally connecting the draft means with each of said wheels.

GLENN J. McQUEEN.